Sept. 22, 1925.
H. V. HAIGHT
DOUBLE DRUM HOIST
Filed May 31, 1924
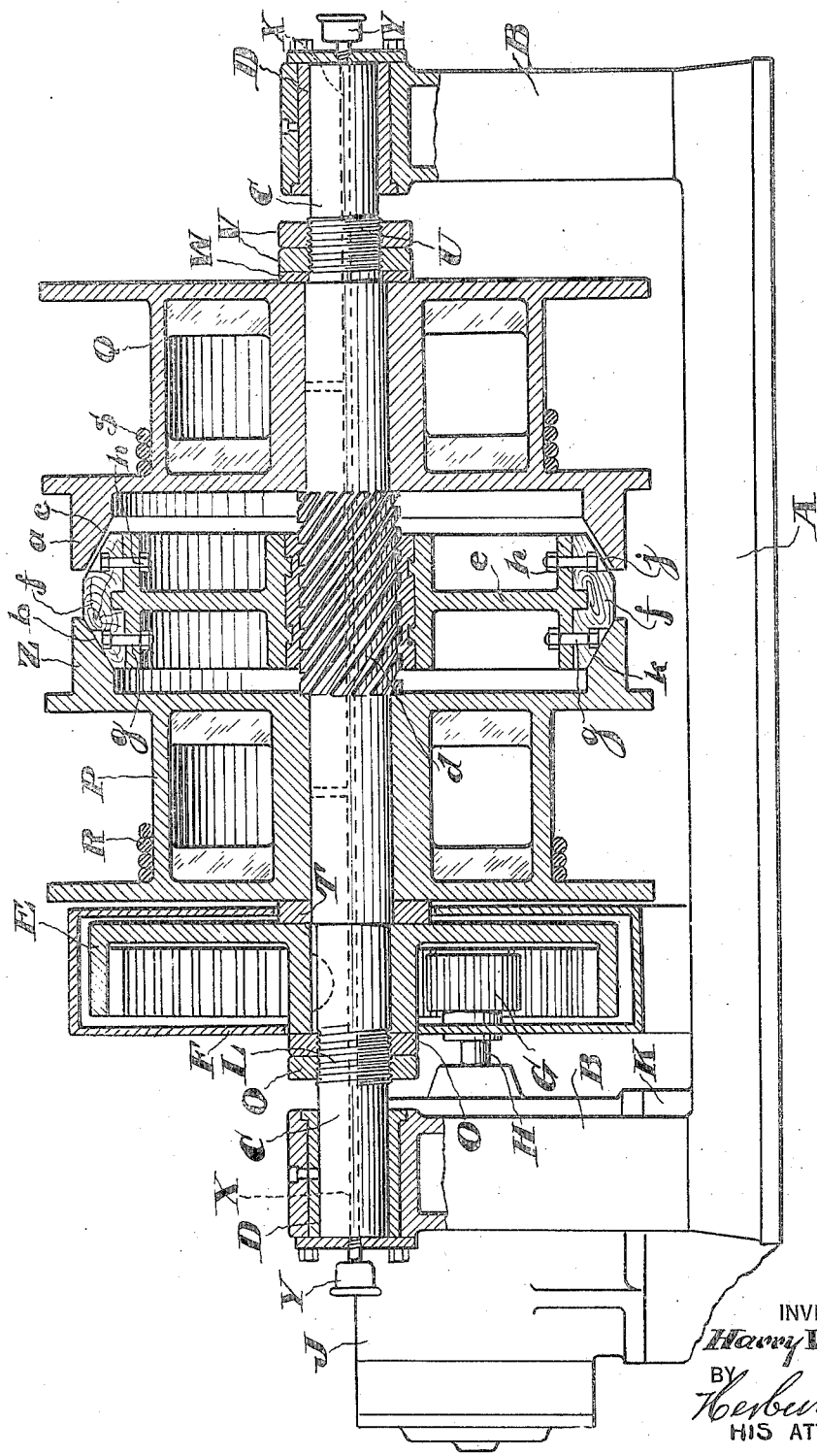
INVENTOR
Harry V. Haight.
BY
Herbert E. Ogden
HIS ATTORNEY Patented Sept. 22, 1925.

1,554,819

UNITED STATES PATENT OFFICE.

HARRY V. HAIGHT, OF SHERBROOKE, ONTARIO, CANADA, ASSIGNOR TO INGERSOLL-RAND COMPANY, OF JERSEY CITY, NEW JERSEY, A CORPORATION OF NEW JERSEY.

DOUBLE-DRUM HOIST.

Application filed May 31, 1924. Serial No. 716,870.

*To all whom it may concern:*

Be it known that I, HARRY V. HAIGHT, a citizen of the Dominion of Canada, and a resident of Sherbrooke, Province of Quebec, Canada, have invented a certain Double-Drum Hoist, of which the following is a specification accompanied by drawings.

This invention relates to hoists, but more particularly to an improved clutch mechanism for a double drum hoist, whereby one or the other of the drums may be driven in accordance with the direction of rotation of the motor.

The objects of this invention are to produce an improved clutch mechanism for a double drum hoist and to enable the clutch to be positively moved into engagement with one or the other of the drums in accordance with the direction of rotation of the motor.

Further objects of the invention will hereinafter appear and the invention is shown in one of its preferred forms in the accompanying drawing, in which—

The figure shows a vertical sectional elevation of a double drum hoist.

Referring to the drawings, A designates the base plate of the hoist on which end frames B are mounted. A shaft C is in this instance mounted in the end frames B and suitable bushings D may be interposed between the shaft C and the end frames B for taking up wear. An internal gear E is preferably keyed to the shaft C and is in this instance enclosed in a suitable housing F. A driving pinion G meshes with the internal gear E and is mounted on the shaft H which is driven by the motor J. The motor J is shown as an electric motor mounted on a suitable base K, although it is to be understood that any suitable type of motor may be employed without departing from the spirit of the invention. The shaft C is in this instance formed with screw threads L on which are screwed nuts O which are adapted to prevent longitudinal movement of the internal gear E in one direction.

A pair of flanged drums P and Q are in this instance rotatable about the shaft C and cables R and S are wound about the drums P and Q respectively. A thrust washer T is located between the drum P and internal gear E and the shaft C is formed with screw threads U adjacent one end thereof and nuts V are screwed onto the screw threads U for preventing longitudinal movement of the drum Q in one direction. The thrust washer W may be mounted between one of the nuts V and the drum Q. The shaft C is preferably formed with suitable lubricant passages X into which lubricant from the cups Y, located at the opposite ends of the shaft C, may be forced for distributing lubricant to the drum bearings. The drums P and Q are preferably formed with opposed flanges Z and a respectively and, if desired, suitable brakes (not shown) may operatively engage these flanges.

The inner faces of the flanges Z and a are cut away to form friction surfaces b and c respectively. A spiral gear d is in this instance formed on the shaft C and a main driver e engages the spiral gear d. The main driver e is in this instance in the form of a wheel of substantially the same diameter as the drums and a suitable friction ring f which may be of wood is connected to the outer periphery of the wheel by the countersunk bolts g and nuts h. The friction ring f is cut away at the opposite sides forming friction faces j and k at each side which are adapted to frictionally engage the friction surfaces c and b respectively on the drum flanges a and Z.

In the operation of the hoist so far described, rotation of the motor J will be transmitted to the internal gear E by means of the pinion G and the shaft C will accordingly be rotated in the same direction. Rotation of the shaft C will cause the spiral gear d to move the main driver e longitudinally relative to the shaft C so that the friction faces j and k on the friction ring f will engage one or the other of the opposed friction surfaces c and b on the drum flanges Z and a respectively according to the direction of rotation of the shaft C. In this manner one drum or the other will be driven according to the direction of rotation of the motor J, and the other drum is free to rotate about the shaft. The spiral gear d on the shaft C creates a thrust to move the main driver e longitudinally relative to the shaft C and thereby force the friction surfaces j and k on the friction ring f into engagement with one or the other of the friction surfaces c and b respectively. In this manner one of the drums P and Q may be driven to wind one of the cables on its respective drum and the cable on the other drum may be freely unwound. In this manner, if a continuous cable is employed and a scoop connected to the cable by driving one of the drums, the scoop will be moved into a pile of ore and filled. Thereafter by reversing the direction of rotation of the motor J in order to move the main driver e to drive the opposite drum, the scoop which is then filled may be moved away from the pile of ore and its load discharged into a car or other vehicle. One or the other of the drums P and Q will be driven by the main driver e in accordance with the direction of rotation of the shaft c and as long as the shaft C is operatively connected to the motor J.

Although one embodiment of my invention is shown on the drawing, it is to be understood that this invention is only limited to the scope of the appended claim and departure may be made from the actual construction shown on the drawing without departing from the spirit of the invention.

I claim.

In a double drum hoist the combination of a shaft, a reversible motor connected to drive said shaft, two independent flanged drums adapted to rotate about said shaft in relatively fixed longitudinal relationship, opposed friction surfaces on said drum flanges, a spiral gear on said shaft, a main driver in the form of a circular member of substantially the same diameter as the drums in engagement with said spiral gear and bodily movable longitudinally of the shaft, and friction surfaces at each side of the periphery of said main driver, said spiral gear being adapted to automatically move one or the other of the said friction surfaces on the main driver into engagement with one or the other of the friction surfaces on the said drum flanges in accordance with the direction of rotation of the motor, whereby one drum or the other will be actuated, while permitting the free drum to rotate in either direction at will.

In testimony whereof I have signed this specification.

HARRY V. HAIGHT.